Oct. 9, 1956
W. D. SEYFRIED
2,765,914
PROCESS FOR REMOVING SULFUR FROM A LIQUEFIABLE
HYDROCARBON OF LESS THAN SIX CARBON ATOMS
Filed Aug. 14, 1953
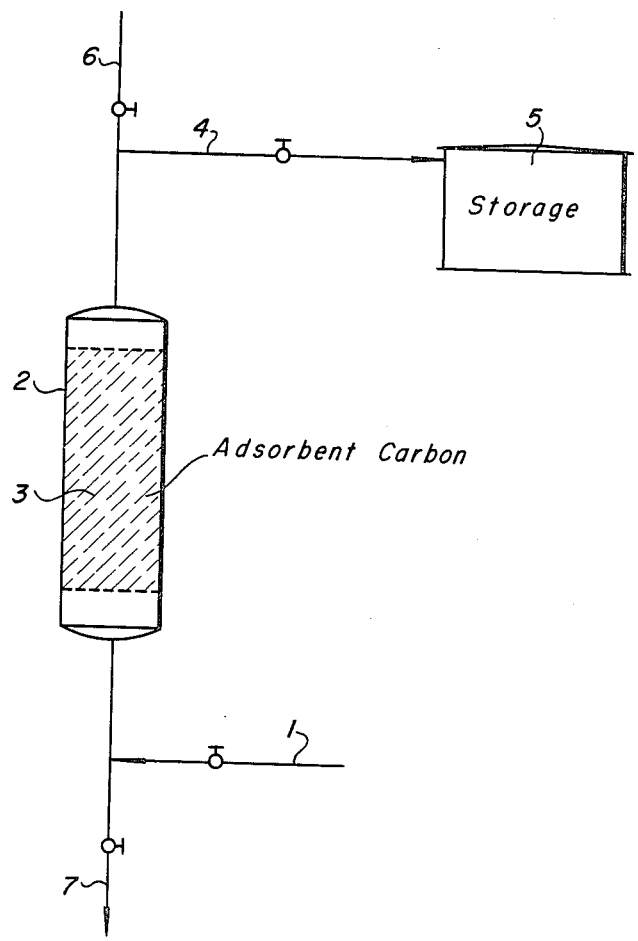
INVENTOR.
Wilson D. Seyfried,
BY
ATTORNEY.

2,765,914

PROCESS FOR REMOVING SULFUR FROM A LIQUEFIABLE HYDROCARBON OF LESS THAN SIX CARBON ATOMS

Wilson D. Seyfried, Baytown, Tex., assignor, by mesne assignments, to Esso Research and Engineering Company, Elizabeth, N. J., a corporation of Delaware Application August 14, 1953, Serial No. 374,376

6 Claims. (Cl. 210—42.5)

The present invention is directed to a method for removing free sulfur from liquefied hydrocarbon gas. Particularly, the invention is directed to removing elemental sulfur from liquefied hydrocarbon gas by adsorption of the sulfur on adsorbent carbon.

The invention may be briefly described as the passing of a liquefied hydrocarbon gas containing free, i. e. elemental, sulfur in solution in excess of about one part per million, in liquid phase in contact with adsorbent carbon, and recovering a liquefied hydrocarbon gas containing less than 1 part per million of free sulfur, which meets specifications for this product.

The liquefied hydrocarbon gas is generally a petroleum gas which is known to the trade as "LPG" (liquefied petroleum gas). LPG may be defined as a liquid comprising essentially hydrocarbons having three to four carbon atoms per molecule. LPG generally consists of propane, or of mixtures of propane with propylene and/or butane. LPG is conventionally prepared and stored in liquid phase and is suitable for use as a fuel. LPG is often found to contain free, i. e. uncombined, elemental sulfur substantially in excess of 1 part per million, for example 2 to 5 parts per million or more.

The treatment in accordance with the present invention may suitably be carried out at a temperature in the range from 40° to 120° F. and preferably at atmospheric temperatures, such as 70° to 100° F.

The treatment will be conducted at a sufficient superatmospheric pressure to maintain the LPG in the liquid phase at the temperature employed.

The adsorbent carbon employed in the practice of the present invention may have a particle size ranging from 15 to 200 mesh. In a fixed bed operation, 40 to 80 mesh carbon is very suitable. The activated carbons obtained in commerce are suitable. Activated carbon prepared from coconut charcoal and activated carbon produced from petroleum coke or petroleum acid sludge may be employed. Suitable activated carbon may also be prepared from other organic materials such as wood, cereals, corncobs, cottonseed hulls, and the like. Sources and methods of preparation of activated carbon are described in the book "Active Carbon" by J. W. Hassler, Chemical Publishing Corp, Brooklyn, N. Y., 1951.

The contacting step of the present invention may be accomplished by passing the sulfur-containing LPG charge through a fixed bed of adsorbent carbon, or by passing the LPG in contact with particles of adsorbent carbon which are maintained in suspension in the LPG.

After the capacity of the carbon for elemental sulfur adsorption has been exhausted, the carbon may be discarded, or it may be regenerated by one of several techniques, including treatment with hydrogen at an elevated temperature, or washing with a suitable solvent such as benzene or other aromatic hydrocarbon at atmospheric temperatures. The carbon is freed of benzene before being returned to use as adsorbent in the present process.

A suitable method of carrying out the present invention is described in connection with the drawing, which represents a schematic flow sheet. Free sulfur-containing LPG from virgin crude or from cracked gases, which has been segregated in fractionation equipment, not shown, and which may have been submitted to other processing steps, such as contact with caustic or with an aqueous alkanol amine solution for removal of $H_2S$ therefrom, is passed as a liquid through line 1 into vessel 2 which contains a bed of adsorbent carbon of 40 to 80 mesh particle size. The system is under sufficient pressure to maintain liquid phase. After contact with said carbon, the LPG, now containing less than 1 part per million of elemental sulfur, is passed through line 4 to storage in tank 5. When the sulfur content of LPG in line 4 reaches 1 part per million, flow of LPG from line 1 and to tank 5 is discontinued and bed 3 is replaced or regenerated. One method for regenerating the bed is as follows: An aromatic hydrocarbon of gasoline boiling range, e. g. benzene, at atmospheric or at elevated temperature is admitted through valved line 6, passed in liquid phase through bed 3, and removed through valved line 7, flow being continued until substantially no sulfur is found in the benzene in line 7. The benzene may then be flushed off with a sulfur free paraffinic stream of gasoline boiling range, e. g. hexane, heptane, or the like, at atmospheric or at elevated temperature, followed by LPG to flush off the remaining paraffin before rerunning flow of specification LPG to tank 5.

The removal of free sulfur in solution in LPG has been a vexing problem. When present in excess of about 1 part per million, elemental sulfur causes the LPG to be corrosive to metals such as copper. The sulfur may not be originally present in elemental form in the LPG, but is often converted to elemental form by breakdown of sulfur-containing compounds during processing, such as distillation at elevated temperatures, particularly if oxygen is present. Thus, it is desirable to remove the sulfur from the LPG cut after other processing steps have been completed. Various treating procedures involving multiple contacts with liquid treating agents have been proposed by the prior art to solve this problem.

It has been long known that activated carbon may be employed to decolorize or deodorize petroleum oils. This includes adsorption, on the carbon, of organic, sulfur-containing compounds. I have now found that activated carbon will selectively adsorb elemental sulfur from its solution in liquid paraffin hydrocarbons; that the capacity of carbon for elemental sulfur is far greater than its capacity for sulfur-containing organic compounds, and is far superior to the capacity of other adsorbents, e. g. alumina, for the same purpose; and that it is essential that the solution be substantially free of aromatic hydrocarbons, since presence of the latter will greatly reduce the capacity of the carbon for sulfur adsorption.

The process of the present invention is particularly suitable to the treatment of LPG. However, it may also be successfully employed in the treatment of other free sulfur-containing hydrocarbon fractions having less than six carbon atoms in the molecule, such as n-butane, n-pentane, or isopentane.

I claim:

1. A process for removing elemental sulfur from a substantially non-aromatic liquefiable hydrocarbon fraction having less than six carbon atoms per molecule and containing dissolved elemental sulfur which comprises bringing said fraction in liquid phase in contact with a solid treating agent consisting solely of activated carbon having the capacity to adsorb said elemental sulfur from said hydrocarbon fraction, removing said hydrocarbon fraction from contact with said treating agent and recovering a substantially sulfur-free product.

2. A process in accordance with claim 1 in which said hydrocarbon fraction is liquefied petroleum gas.

3. A process for removing elemental sulfur from a substantially non-aromatic liquefiable hydrocarbon fraction having less than six carbon atoms per molecule and containing dissolved elemental sulfur in a concentration substantially in excess of one part per million, which comprises bringing said fraction in liquid phase into contact with a bed consisting solely of activated carbon having the capacity to adsorb said elemental sulfur from said hydrocarbon fraction, removing the hydrocarbon fraction from contact with said bed and recovering a product containing less than one part per million of elemental sulfur.

4. In the process of claim 3, the step of periodically regenerating the bed of activated carbon by passing therethrough, in sequence, an aromatic hydrocarbon and a paraffinic hydrocarbon, each of gasoline boiling range, and liquefied petroleum gas.

5. A process for removing elemental sulfur from a feed stock consisting essentially of non-aromatic liquefiable hydrocarbons having less than 6 carbon atoms per molecule and containing more than about 1 part per million of dissolved sulfur which comprises bringing said feed stock in liquid phase into contact with a solid treating agent consisting solely of activated carbon having the capacity to adsorb said elemental sulfur from said feed stock, removing said feed stock from contact with said treating agent and recovering a product containing less than about 1 part per million of dissolved sulfur.

6. A process as in claim 5 wherein the feed stock consists essentially of liquefied petroleum gas having more than about 1 part per million of sulfur dissolved therein.

References Cited in the file of this patent

UNITED STATES PATENTS

| | | |
|---|---|---|
| 2,309,871 | Schulze et al. | Feb. 2, 1943 |
| 2,322,316 | Rummelsburg | June 22, 1943 |
| 2,449,051 | Brith et al. | Sept. 14, 1948 |
| 2,530,300 | Hirschler et al. | Nov. 14, 1950 |
| 2,585,492 | Olsen | Feb. 12, 1952 |
| 2,586,889 | Vesterdal et al. | Feb. 26, 1952 |
| 2,599,545 | Egan et al. | June 10, 1952 |

OTHER REFERENCES

Chemical Engineering, September 1951, "Adsorbing Aromatics." (Page 234 relied on. Copy in Scientific Library.)